United States Patent
Sartori et al.

(10) Patent No.: US 6,683,916 B1
(45) Date of Patent: Jan. 27, 2004

(54) ADAPTIVE MODULATION/CODING AND POWER ALLOCATION SYSTEM

(76) Inventors: Philippe Jean-Marc Sartori, 9 Winding Canyon CT., Algonquin, IL (US) 60102; Kevin Lynn Baum, 3450 Richnee La., Rolling Meadows, IL (US) 60008; Brian Keith Classon, 756 W. Bloomfield Ct., Palatine, IL (US) 60067

( * ) Notice: Subject to any disclaimer, the term of this patent is extended or adjusted under 35 U.S.C. 154(b) by 24 days.

(21) Appl. No.: 10/197,382

(22) Filed: Jul. 17, 2002

(51) Int. Cl.[7] .......................... H04L 27/04; H04L 23/00
(52) U.S. Cl. ....................................... 375/295; 375/377
(58) Field of Search ................................ 375/222, 377, 375/295, 224, 225, 226, 227, 261, 308, 279, 280, 281

(56) References Cited

U.S. PATENT DOCUMENTS

| | | | | | |
|---|---|---|---|---|---|
| 6,031,831 | A | * | 2/2000 | Tan Boon et al. | 370/342 |
| 6,304,593 | B1 | * | 10/2001 | Alouini et al. | 375/216 |
| 6,385,462 | B1 | * | 5/2002 | Baum et al. | 455/522 |
| 6,452,964 | B1 | * | 9/2002 | Yoshida | 375/222 |

* cited by examiner

*Primary Examiner*—Tesfaldet Bocure
(74) *Attorney, Agent, or Firm*—Kenneth A. Haas

(57) ABSTRACT

In accordance with the preferred embodiment of the present invention, excess power is distributed to certain streams in order to increase the stream's signal quality, and thus, its encoding rate. Although certain streams will have their overall power, and thus their signal quality reduced, in the preferred embodiment of the present invention the reduction in signal quality is limited so that the encoding rate for these streams remains unchanged.

20 Claims, 3 Drawing Sheets

ADAPTIVE MODULATION/CODING AND POWER ALLOCATION SYSTEM

FIELD OF THE INVENTION

The present invention relates generally to communication systems and in particular, to adaptive modulation/coding and power allocation in such communication systems.

BACKGROUND OF THE INVENTION

In order to increase the throughput of a link within a communication system, it has been proposed to utilize multistream transmission techniques with spatial multiplexing. In its simplest sense, multistream transmission can be thought of as the transmission of multiple data streams from a single transmitter source, using multiple transmit antennas, to a single receiver, using multiple receive antennas. Each data stream is transmitted utilizing the same channel resource (e.g., frequency/timeslot/code) and can be distinguished by the receiver due to the fact that the antennas are separated spatially at both the transmitter and the receiver. The receiver combines the signals from the multiple receive antennas to reconstruct the transmitted multistream data. Additionally, multistream methods can be combined with feedback from the receiver to the transmitter so that adjustments can be made for changing channel conditions.

It has been proposed to utilize stream-level adaptive modulation and coding (AMC) and stream-level power control techniques along with multistream transmission to further improve link performance. With stream-level power control (simply referred from now on as 'power control'), the power of a transmitted stream is adjusted to some target power in order to meet a target signal-to-interference-plus-noise ratio, S/(I+N), at the receiver. (S/(I+N) is provided via feedback from the receiver). With stream-level AMC (simply referred from now on as 'AMC'), the modulation and coding format of a stream is changed to match the current received signal quality (S/(I+N)). In a system with AMC along with multistream transmission, streams with high S/(I+N) are typically assigned higher-order modulations and high code rates (e.g., 64-QAM with rate-¾ convolutional coding), with the modulation-order and/or the code rate decreasing as S/(I+N) decreases. In a system with AMC combined with power control along with multistream transmission, streams with high S/(I+N) are typically assigned higher power along with higher-order modulations and high code rates, with the power level, the modulation-order and/or the code rate decreasing as S/(I+N) decreases. The total available link power is usually distributed across streams in order to match or approximate a water-filling distribution.

Unfortunately, current AMC and power-control methods fail to make efficient use of power-control techniques to allow for the highest combined data throughput over the various streams utilized by the receiver. More particularly, a number of streams may not have sufficient power to support higher code rates while other streams may be utilizing more power than is necessary to support the higher code rates. Accordingly, there is a need for AMC and power allocation which makes make efficient use of power-control techniques to allow for the highest combined data throughput over the various streams utilized by a receiver.

DETAILED DESCRIPTION OF THE DRAWINGS

Figure 1:
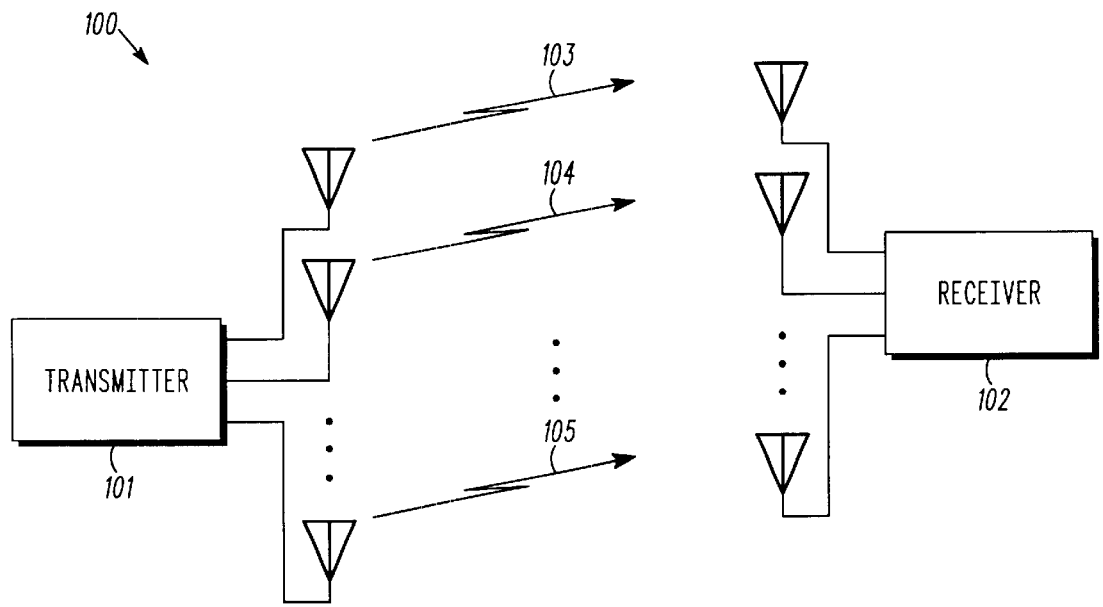
FIG. 1 is a block diagram of a communication system in accordance with the preferred embodiment of the present invention.

In order to address the above-mentioned need, a multistream AMC and power allocation system is provided herein. In accordance with the preferred embodiment of the present invention, excess power is distributed to certain streams of a link in order to increase the stream's signal quality, and thus, its encoding rate. Although certain streams will have their overall power, and thus their signal quality reduced, in the preferred embodiment of the present invention the reduction in signal quality is limited so that the encoding rate for these streams remains unchanged. It should be noted that although in the preferred embodiment of the present invention "encoding rate" refers to a channel coding rate combined with a modulation rate ('modulation and coding rate'), however in alternate embodiments of the present invention "encoding rate" may not include the modulation rate, or may also include a spreading factor or a repetition factor. (Modulation rate refers to the number of channel bits that are represented per modulation symbol. For example, QPSK modulation represents 2 bits per symbol, and 16 QAM modulation represents 4 bits per symbol).

In a communication system where multiple data streams are transmitted to a single user, a method for adaptive modulation/coding and power allocation, the present invention encompasses a method comprising the steps of transmitting a first data stream to the user, wherein the first data stream has a first encoding rate and a first power level, and transmitting a second data stream to the user, wherein the second data stream has a second encoding rate and a second power level. An excess power is determined for the first data stream, wherein the excess power comprises a reduction in power that the first data stream can undergo while still maintaining the first encoding rate, and the first power level is reduced for the first data stream while maintaining the first encoding rate for the first data stream. Finally, the second power level is increased for the second data stream while increasing the second encoding rate for the second data stream.

The present invention additionally encompasses a method comprising the steps of transmitting a first data stream to the user, wherein the first data stream has a first encoding rate and a first quality level, transmitting a second data stream to the user, wherein the second data stream has a second encoding rate and a second quality level, and determining an excess quality for the first data stream, wherein the excess quality comprises a reduction in quality that the first data stream can undergo while still maintaining the first encoding rate. The first quality level for the first data stream is reduced while maintaining the first encoding rate for the first data stream, and the second quality level is increased for the second data stream while increasing the second encoding rate for the second data stream.

The present invention encompasses an apparatus. The apparatus comprises a first transmitter outputting a first data stream to a user, wherein the first data stream has a first encoding rate and a first power level, a second transmitter outputting a second data stream to the user, wherein the second data stream has a second encoding rate and a second power level, and a logic unit determining an excess power for the first data stream, wherein the excess power comprises a reduction in power that the first data stream can undergo while still maintaining the first encoding rate. The apparatus additionally comprises a power distribution unit reducing the first power level for the first data stream and maintaining the first encoding rate for the first data stream while increasing the second power level for the second data stream and increasing the second encoding rate for the second data stream.

Turning now to the drawings, wherein like numerals designate like components, FIG. 1 is a block diagram of communication system 100 in accordance with the preferred embodiment of the present invention. In the preferred embodiment of the present invention communication system utilizes a *Multiple Input Multiple Output* (MIMO) technique as described in G. J. Foschini and M. J. Gans, "On limits of wireless communications in a fading environment when using multiple antennas", *Wireless Personal Commun.*, vol. 6, pp. 311–335, March 1998. With such a system the transmission of multiple data streams 103–105 are transmitted to a single user over multiple antennas. In a first embodiment each stream is transmitted via a different antenna, and in a second embodiment each stream is distributed across all antennas, with a different complex weight on each antenna, where the weighted streams are summed on each antenna prior to transmission. As is known in the art, the combination of the streams being transmitted to a user is referred to as a link. Additionally, although communication system 100 is shown as a wireless communication system, it should be understood that the present invention may be advantageously implemented in any communication system with multiple signal paths between a transmitter and a receiver.

As discussed above, each data stream 103–105 is transmitted utilizing the same channel resource (e.g., frequency/timeslot/code) and can be distinguished by receiver 102 due to the fact that the transmitter's antennas are spatially separated. Each stream is assigned a modulation/coding rate from a finite set of rates, with the total power output for the streams being held constant. The modulation/coding rate determines the encoding rate of the stream. Each antenna on receiver 102 receives a combination of streams 103–105 and receiver 102 combines signals from the multiple receive antennas to recover streams 103–105 and reconstruct the transmitted data.

Figure 2:
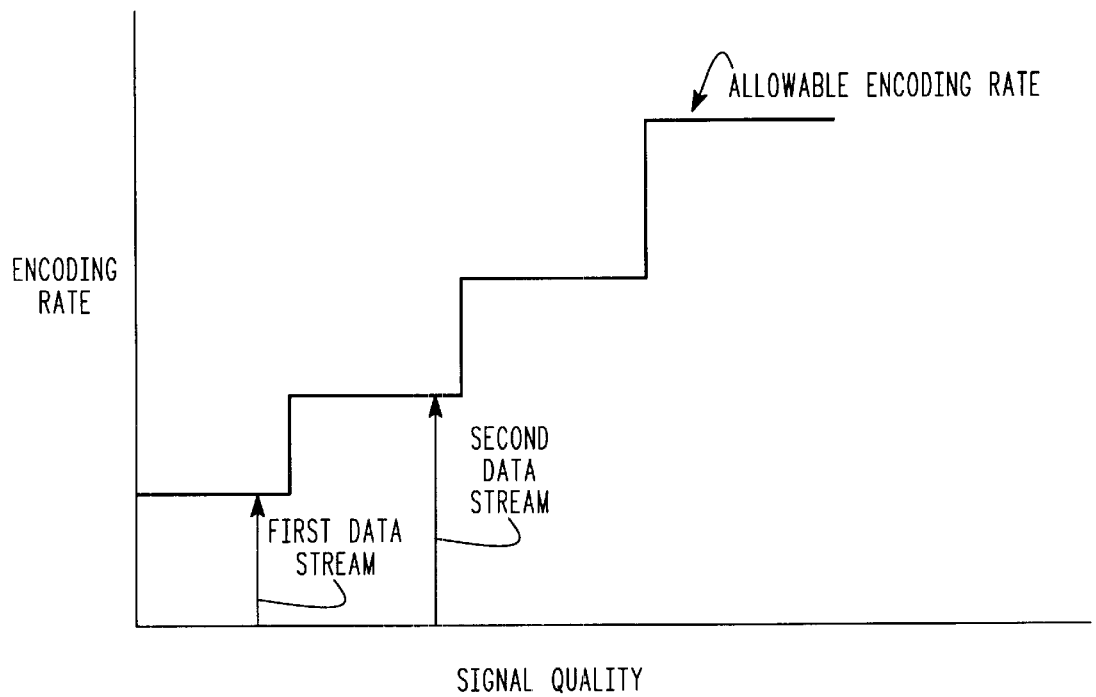
FIG. 2 illustrates AMC and power control in accordance with the preferred embodiment of the present invention.

As discussed above prior-art techniques utilizing power control along with AMC are inefficient in that a number of streams may not have sufficient power to support higher code rates while other streams may be utilizing more power than is necessary to support the higher code rates. This is illustrated in FIG. 2 showing allowable encoding rates as a function of signal quality. As is evident, as the signal quality increases, higher encoding rates can be utilized. FIG. 2 also illustrates the inefficiencies of prior-art per-stream power control/encoding. As is evident, the second data stream is operating at a much higher signal quality than is necessary to maintain its encoding rate, while the first data stream is just short of achieving the necessary signal quality to boost its encoding rate.

In order to address this issue, in the preferred embodiment of the present invention excess power is distributed to certain streams in order to increase the stream's signal quality, and thus, its encoding rate. Although certain streams will have their overall power, and thus their signal quality, reduced, in the preferred embodiment of the present invention the reduction in signal quality is limited so that the encoding rate for the stream remains unchanged. This is illustrated in FIG. 3.

Figure 3:
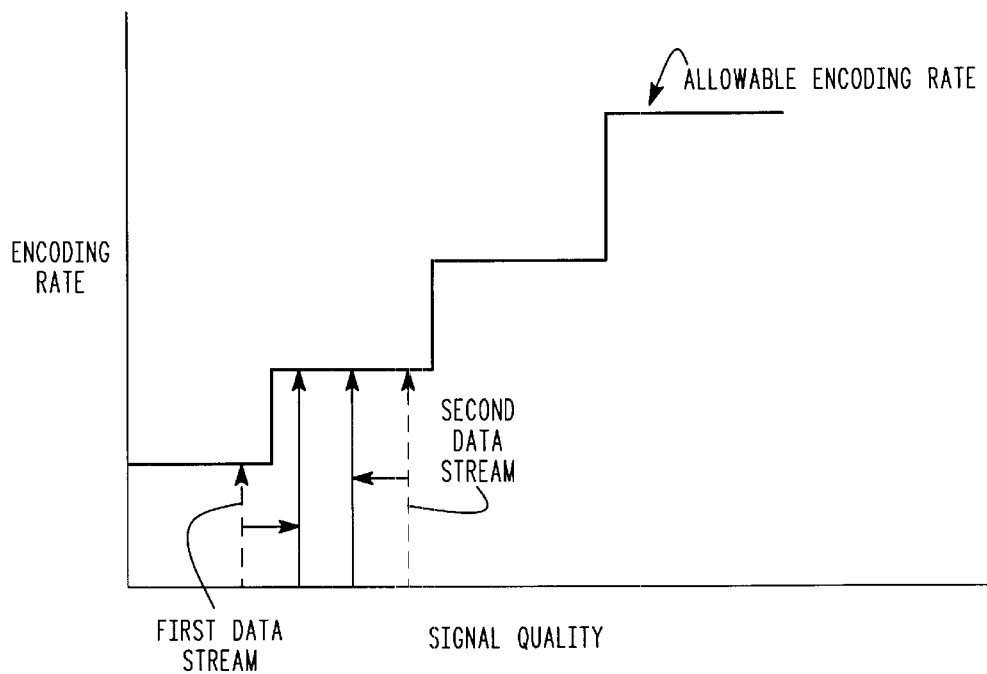
FIG. 3 illustrates AMC and power control in accordance with the preferred embodiment of the present invention.

As shown in FIG. 3, the signal quality of the second received data stream has been reduced (by decreasing the transmit power) while the signal quality of the first data stream has been increased (by increasing the transmit power). In the preferred embodiment of the present invention the total link power ($P_\mu$) transmitted to the receiver has remained unchanged, yet the total link data rate has increased due to the fact that the first data stream can now operate utilizing the higher encoding rate. Thus, in accordance with the preferred embodiment of the present invention, each stream 103–105 is assigned a modulation/coding rate (MCR) from a finite set of rates along with a power level $P_i$. Each stream is assigned the highest MCR from this finite set that can be supported, given its C/I value. However, some transmit power (excess power) is wasted on excess stream margin whenever the C/I of a stream is higher than the minimum C/I required for the assigned MCR.

In the preferred embodiment of the present invention the prior-art is improved upon by distributing any such excess power to certain streams in order to increase the streams encoding rate while maintaining the encoding rate for streams having their power reduced. Additionally, throughout the above procedure the total link power output for the N data streams, $$P_\mu = \sum_{i=1}^{N} P_i,$$

is held to a constant value, where $P_i$ is the power output for the ith data stream. By keeping the total link power output constant, the amount of co-channel interference that the transmitter causes (in a cellular communication system with frequency reuse, for example) is not increased, even though the transmitted data rate has been increased.

Figure 4:
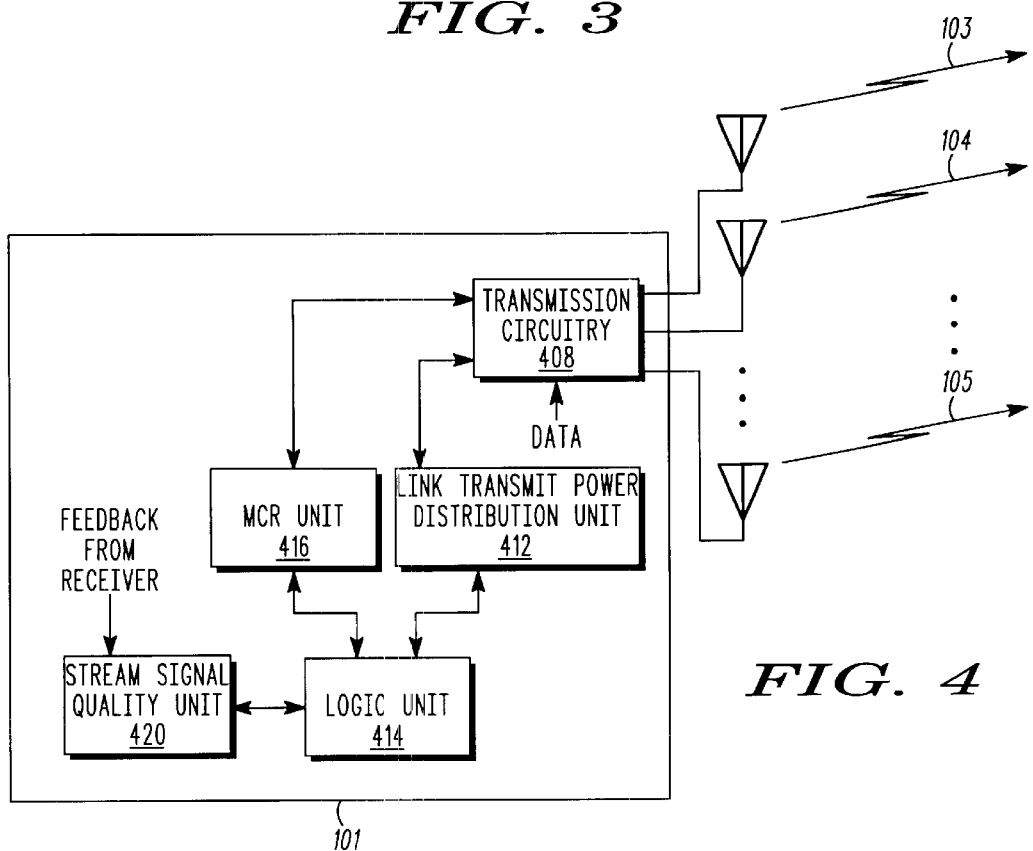
FIG. 4 is a block diagram of a transmitter in accordance with the preferred embodiment of the present invention.

FIG. 4 is a block diagram of a transmitter 101 in accordance with the preferred embodiment of the present invention. As shown, transmitter 101 comprises logic unit 414, stream signal quality unit 420, MCR unit 416, link transmit power distribution unit 412, and transmission circuitry 408. Logic unit 414 adaptively controls resource allocation to data streams 103–105 transmitted to receiver 102. In particular, logic unit 414 controls transmit power allocated to each of the data streams (via power unit 412) along with the encoding rate for each link (via MCR unit 416). Although transmission circuitry 408 is shown as a single transmitting unit, one of ordinary skill in the art will recognize that transmission circuitry 408 typically comprises multiple transmitters for transmission purposes.

Operation of transmitter 101 in accordance with the preferred embodiment of the present invention occurs as follows: Logic unit 414 originally instructs power distribution unit 412 to transmit utilizing the same power level for all N downlink streams. Stream signal quality unit 420 then provides a quality feedback for each of the N streams. Logic unit 414 accesses stream signal quality unit 420 to obtain the stream quality for the N downlink signals being transmitted to the receiver. Logic unit 414 then calculates a maximum encoding rate for each stream based on the quality feedback (typically a quantized S/(I+N) or a desired modulation/coding rate), and instructs MCR unit 416 to utilize the best MCR the stream can support for each stream.

It should be noted that in an alternate embodiment, each stream may initially utilize differing encoding rates based on its downlink quality. In this embodiment the receiver initially measures channel characteristics based on pilot symbols, and feeds back the information (typically a quantized S/(I+N) or a desired modulation/coding rate) to the transmitter. The transmitter can then perform the AMC and power allocation based on the measured channel characteristics.

Continuing, logic unit 414 then determines excess power for the downlink transmission. As discussed above, the excess power for the downlink transmission comprises a total decrease in power that the transmissions may undergo without changing the encoding rates for the downlink streams. Once the excess power has been determined, logic unit 414 instructs power distribution unit 412 to decrease the power of individual streams while increasing the power of others. Simultaneously, logic unit 414 instructs MCR unit 416 to increase the encoding rate of streams having their power increased.

Figure 5:
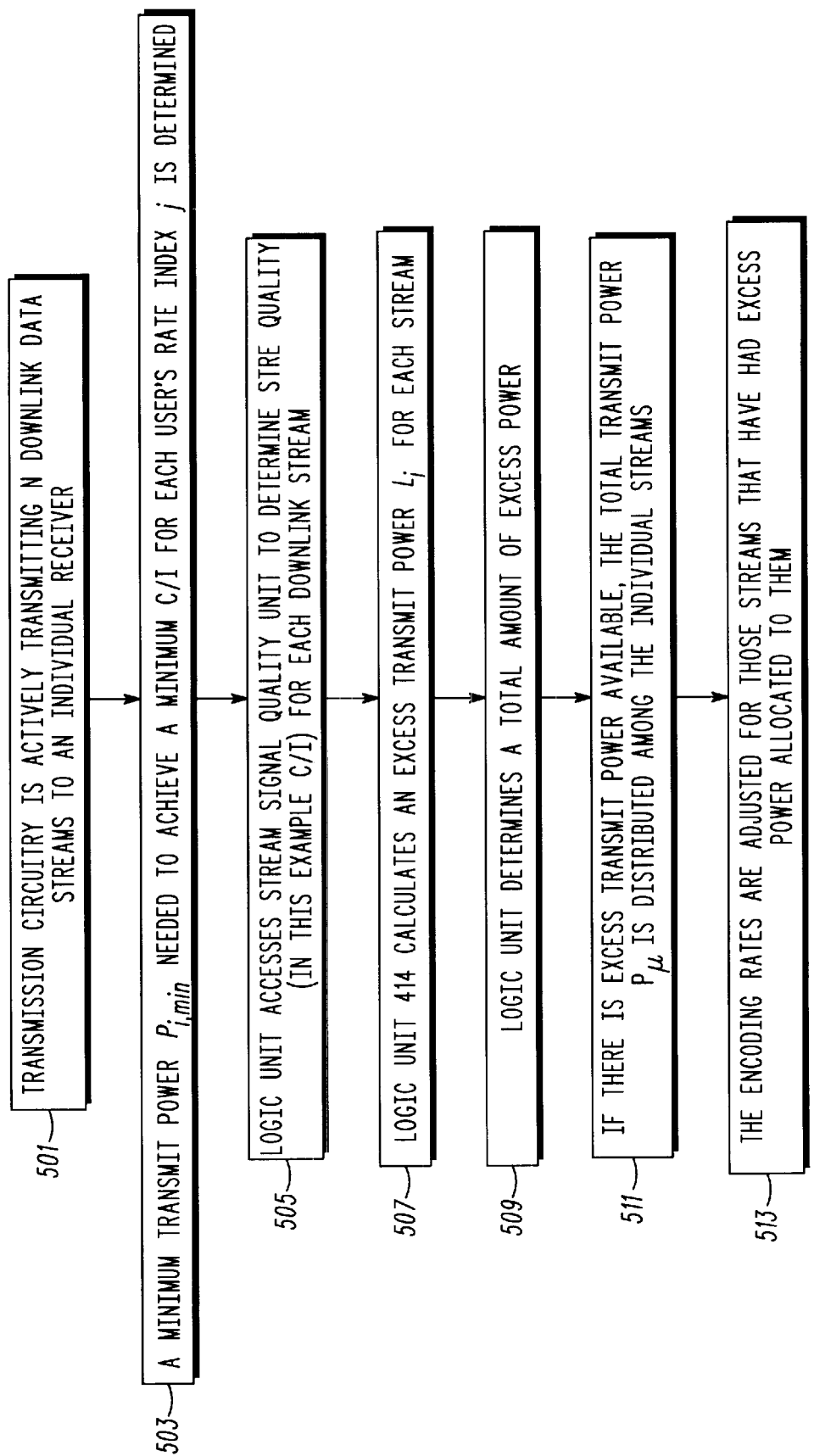
FIG. 5 is a flow chart showing operation of the communication system of FIG. 1 in accordance with the preferred embodiment of the present invention.

FIG. 5 is a flow chart showing operation of the communication system of FIG. 1 in accordance with the preferred embodiment of the present invention. For purposes of this example it is assumed that there are six discrete rates or MCRs, each with an associated modulation format, code rate, and rate index j. The rate index is an integer greater than or equal to 1, where the minimum MCR is assigned rate index 1, the next larger MCR is assigned rate index 2, and so forth. The total number of MCRs is denoted as J (note that J=6 for this embodiment). Each MCR is obtained from the combination of the modulation format and the coding rate. As discussed above, each MCR has an associated minimum signal quality that is necessary to support the particular MCR. For example, if the signal quality is specified as a carrier to interference (C/I) ratio, then $\phi_j$ denotes the minimum required C/I to support the MCR with rate index j. In this case, the $i^{th}$ stream can be assigned the MCR with rate index j if $\phi_j \leq (C/I)_i < \phi_{j+1}$. Table 1 illustrates various modulation rates that can be utilized. Note that the signal quality thresholds can vary over time, because of different channel conditions, or changing QoS requirements for the data streams. Note also that it is very possible that the signal quality of a stream is below the minimum threshold to be assigned an MCR. In that case, no data is sent on this data stream.

TABLE 1

Example set of modulation formats and channel code rates, which provide a set of discrete encoding rates.

| Rate Index j (or MCR index) | Modulation Format | Code Rate | Encoding Rate: (Information Bits/Symbol, or MCR) |
|---|---|---|---|
| 1 | QPSK | 3/16 | 0.375 |
| 2 | QPSK | 3/8 | 0.75 |
| 3 | QPSK | 3/4 | 1.5 |
| 4 | 16-QAM | 3/4 | 3 |
| 5 | 64-QAM | 3/4 | 4.5 |
| 6 | 64-QAM | Uncoded | 6 |

The logic flow begins at step 501 where transmission circuitry 408 is actively transmitting N downlink data streams to an individual receiver. In particular, at least a first and a second data stream is transmitted to a user, where the first and the second data stream have a first and second encoding rate and a first and second power level, respectively. As discussed above, the total link power $P_\mu$ for the downlink transmissions to the receiver is held constant. For each stream, a minimum transmit power $P_{i,min}$ needed to achieve a minimum C/I for each link's rate index j is at step 503. In this example, data stream i needs a minimum transmit power of:

$$P_{i,min} = \frac{P_\mu}{N} \frac{\phi_j}{(C/I)_i} \quad (2)$$

to support rate index j, where $\phi_j$ is the lowest C/I (linear scale) which can support rate index j.

At step 505, logic unit 414 accesses stream signal quality unit 420 to determine stream quality (in this example C/I) for each downlink stream and based on the stream quality logic unit 414 calculates an excess transmit power $L_i$ for each stream (step 507). The excess transmit power (quality) $L_i$ is determined for each stream as a difference between the actual stream transmit power and the minimum stream transmit power $P_{i,min}$ needed to maintain the current encoding rate j. The excess transmit power $L_i$ of a single stream i is given by equation (3), where $$L_i = \frac{P_\mu}{N}\left(1 - \frac{\phi_j}{(C/I)_i}\right). \quad (3)$$

If the signal quality on a stream is too low to be assigned a MCR, all the power assigned to this stream is excess power, so that the excess transmit power $L_i$ of a single stream i is given by equation (4), where $$L_i = \frac{P_\mu}{N}. \quad (4)$$

At step 509 logic unit 414 determines a total amount of excess power ($P_{XS}$) available, where $$P_{XS} = \sum_{i=1}^{N} L_i.$$

If there is excess transmit power available, at step 511 the total transmit power $P_\mu$ is distributed among the individual streams as discussed above. In particular some streams that have excess power will have their power reduced while maintaining their encoding rates. The excess power will be allocated to those data streams that will be able to increase their encoding rates with the excess power allocated to them. One way to accomplish this would be to lower all streams to their lowest allowable power level $P_{i,min}$ and then use the remaining power ($P_{XS}$) to selectively increase the power for streams needing the lowest amount of power to increase their index. For example, since the total excess transmit power $P_{XS}$ from all streams is given by:

$$P_{XS} = \sum_{i=1}^{N} L_i = P_\mu\left[1 - \sum_{i:(C/I)_i \geq \phi_1} \frac{1}{N} \frac{\phi_j}{(C/I)_i}\right]. \quad (5)$$

To increase stream i from rate index j to rate index j+1 would require an amount of additional stream transmit power $\Delta P_{j,j+1}^i$ given by:

$$\Delta P_{j,j+1}^i = \frac{P_\mu}{N} \frac{(\phi_{j+1} - \phi_j)}{(C/I)_i} \quad (6)$$

to be added to the minimum transmit power $P_{i,min}$ already assumed for stream i. For the special case of $(C/I)_i < \phi_1$ the amount of additional stream transmit power needed to bring the stream to the minimum supported MCR would be given by:

$$\Delta P_{0,1}^i = \frac{P_\mu}{N} \frac{\phi_1}{(C/I)_i}. \quad (7)$$

Finally, at step 513, the encoding rates are adjusted for those streams that have had excess power allocated to them.

While the invention has been particularly shown and described with reference to a particular embodiment, it will be understood by those skilled in the art that various changes in form and details may be made therein without departing from the spirit and scope of the invention. For example, he current description assumes that the AMC levels are discrete, and that the power adjustment capability is continuous. One of ordinary skill in the art will realize that the above description is also applicable to the case where the both the AMC levels and the power control steps are discrete rather than continuous. Additionally, the above embodiments were described using a particular MIMO technique. One of ordinary skill in the art will recognize that the above procedures may be utilized with any MIMO transmission scheme. It is intended that such changes come within the scope of the following claims.

What is claimed is:

1. In a communication system where multiple data streams are transmitted to a single user, a method for adaptive modulation/coding and power allocation, the method comprising the steps of:
   transmitting a first data stream to the user, wherein the first data stream has a first encoding rate and a first power level;
   transmitting a second data stream to the user, wherein the second data stream has a second encoding rate and a second power level;
   determining an excess power for the first data stream, wherein the excess power comprises a reduction in power that the first data stream can undergo while still maintaining the first encoding rate;
   reducing the first power level for the first data stream while maintaining the first encoding rate for the first data stream; and
   increasing the second power level for the second data stream while increasing the second encoding rate for the second data stream.

2. The method of claim 1 where in the step of transmitting the first data stream to the user comprises the step of transmitting the first data stream having a first encoding rate chosen from a finite set of encoding rates.

3. The method of claim 1 where in the step of transmitting the first data stream to the user comprises the step of transmitting the first data stream having a first transmit power level chosen from a discrete set of power levels.

4. The method of claim 1 further comprising the step of:
   holding a total power output substantially constant for the user, the total power output being a sum of the power of the first and the second data streams.

5. The method of claim 1 wherein the step of transmitting the first and the second data streams to the user comprises the steps of transmitting the first and the second data streams to the user over a same channel resource.

6. The method of claim 1 wherein the step of transmitting the first and the second data streams to the user comprises the steps of transmitting the first and the second data streams to the user over a first and a second antenna.

7. The method of claim 1 wherein the step of transmitting the first and the second data streams using the first and the second encoding rates comprises the step of transmitting the first and the second data streams using QPSK or QAM modulation.

8. The method of claim 1 wherein the step of transmitting the first and the second data streams using the first and the second encoding rates comprises the step of transmitting the first and the second data streams having a first and second encoding rates, wherein the first and the second encoding rates are taken from the group consisting of a channel coding rate, a modulation rate, a spreading factor and a repetition factor.

9. In a communication system where multiple data streams are transmitted to a single user, a method for adaptive modulation/coding and power allocation, the method comprising the steps of:
   transmitting a first data stream to the user, wherein the first data stream has a first encoding rate and a first quality level;
   transmitting a second data stream to the user, wherein the second data stream has a second encoding rate and a second quality level;
   determining an excess quality for the first data stream, wherein the excess quality comprises a reduction in quality that the first data stream can undergo while still maintaining the first encoding rate;
   reducing the first quality level for the first data stream while maintaining the first encoding rate for the first data stream; and
   increasing the second quality level for the second data stream while increasing the second encoding rate for the second data stream.

10. The method of claim 9 wherein the step of transmitting the first and the second data streams to the user comprises the steps of transmitting the first and the second data streams to the user over a same channel resource.

11. The method of claim 9 wherein the step of transmitting the first and the second data streams to the user comprises the steps of transmitting the first and the second data streams to the user over a first and a second antenna.

12. The method of claim 9 wherein the step of transmitting the first and the second data streams using the first and the second encoding rates comprises the step of transmitting the first and the second data streams using QPSK or QAM encoding.

13. The method of claim 9 wherein the step of transmitting the first and the second data streams using the first and the second encoding rates comprises the step of transmitting the first and the second data streams having a first and second encoding rates, wherein the first and the second encoding rates are taken from the group consisting of a channel coding rate, a modulation rate, a repetition factor and a spreading factor.

14. An apparatus comprising:
   a first transmitter outputting at least a component of a first data stream to a user, wherein the first data stream has a first encoding rate and a first power level;
   a second transmitter outputting at least a component of a second data stream to the user, wherein the second data stream has a second encoding rate and a second power level;

a logic unit determining an excess power for the first data stream, wherein the excess power comprises a reduction in power that the first data stream can undergo while still maintaining the first encoding rate; and a power distribution unit reducing the first power level for the first data stream and maintaining the first encoding rate for the first data stream while increasing the second power level for the second data stream and increasing the second encoding rate for the second data stream.

15. The apparatus of claim 14 where in the first and the second encoding rates are chosen from a finite set of encoding rates.

16. The apparatus of claim 14 where in the first and the second transmit power levels are chosen from a discrete set of power levels.

17. The apparatus of claim 14 wherein the total power output for the first and the second data streams is held substantially constant.

18. The apparatus of claim 14 wherein the first and the second data streams are transmitted to the user over a same channel resource.

19. The apparatus of claim 14 wherein the first and the second data streams are transmitted to the user using QPSK or QAM encoding.

20. The apparatus of claim 14 wherein the encoding rates are taken from the group consisting of a channel coding rate, a modulation rate, a repetition factor and a spreading factor.

* * * * *